US010855132B2

(12) United States Patent
Houzumi et al.

(10) Patent No.: US 10,855,132 B2
(45) Date of Patent: Dec. 1, 2020

(54) BUS BAR UNIT, ROTARY ELECTRIC MACHINE HAVING THE SAME, AND MANUFACTURING METHOD OF BUS BAR UNIT

(71) Applicant: TOP Co., Ltd., Echizen (JP)

(72) Inventors: Nobuji Houzumi, Kanagawa (JP); Kenji Sasaki, Fukui (JP); Yoshihiro Kodera, Fukui (JP)

(73) Assignee: TOP CO., LTD., Echizen (JP)

( * ) Notice: Subject to any disclaimer, the term of this patent is extended or adjusted under 35 U.S.C. 154(b) by 401 days.

(21) Appl. No.: 15/578,622

(22) PCT Filed: Jul. 22, 2015

(86) PCT No.: PCT/JP2015/070867
§ 371 (c)(1),
(2) Date: Nov. 30, 2017

(87) PCT Pub. No.: WO2017/013773
PCT Pub. Date: Jan. 26, 2017

(65) Prior Publication Data
US 2018/0159397 A1  Jun. 7, 2018

(51) Int. Cl.
*H02K 3/38* (2006.01)
*H02K 3/50* (2006.01)
(Continued)

(52) U.S. Cl.
CPC ............... *H02K 3/38* (2013.01); *H02K 3/28* (2013.01); *H02K 3/50* (2013.01); *H02K 5/1732* (2013.01); *H02K 2203/09* (2013.01)

(58) Field of Classification Search
CPC ........ H02K 2203/09; H02K 3/38; H02K 3/50; H02K 2203/12; H02K 3/32; H02K 3/505; H02K 5/1732
(Continued)

(56) References Cited

U.S. PATENT DOCUMENTS 5,118,978 A * 6/1992 Matsumoto ............. F02B 75/16
123/149 D
2013/0140939 A1 * 6/2013 Asaga .................... H02K 1/276
310/216.129
(Continued)

FOREIGN PATENT DOCUMENTS

DE  10200805452 A1 * 6/2010  ............... H02K 5/15
JP  2000224801 A * 8/2000
(Continued)

OTHER PUBLICATIONS

Dillmann (DE 102008054527 A1) English Translation (Year: 2010).*
(Continued)

*Primary Examiner* — Tulsidas C Patel
*Assistant Examiner* — Robert E Mates
(74) *Attorney, Agent, or Firm* — Rabin & Berdo, P.C.

(57) ABSTRACT

A bus bar unit includes: a plurality of bus bars arranged to be laminated, the respective bus bars having conductivity, the respective bus bars having a hole part; an insulating member interposed between the bus bars, the insulating member having insulating property, the insulating member having a hole part; a positioning member formed by insulating resin, the positioning member having a pin protruding in direction of laminating the bus bars, the pin being inserted through the hole parts of the bus bars and the hole part of the insulating member; and a fixing part provided at a tip end of the pin, the fixing part being configured to fix the bus bars and the insulating member.

8 Claims, 7 Drawing Sheets

(51) Int. Cl.
*H02K 3/28* (2006.01)
*H02K 5/173* (2006.01)

(58) Field of Classification Search
USPC .............................................. 310/71, 43, 45
See application file for complete search history.

(56) References Cited

U.S. PATENT DOCUMENTS

| | | |
|---|---|---|
| 2014/0015359 A1 | 1/2014 | Chamberlin et al. |
| 2015/0097462 A1* | 4/2015 | Fukumoto ................ H02K 1/06 310/216.048 |
| 2015/0130299 A1* | 5/2015 | Oga ........................ B32B 27/12 310/43 |

FOREIGN PATENT DOCUMENTS

| | | | |
|---|---|---|---|
| JP | 2009254157 A | * | 10/2009 |
| JP | 2012-060831 A | | 3/2012 |
| JP | 2012060831 A | * | 3/2012 |
| JP | 2012/231561 A | | 11/2012 |
| JP | 2013-212008 A | | 10/2013 |
| JP | 2014158421 A | * | 8/2014 |

OTHER PUBLICATIONS

Kono (JP 2012060831 A) English Translation (Year: 2012).*
Kurata (JP 2009254157 A) English Translation (Year: 2009).*
Toyama (JP 2000224801 A) English Translation (Yeaar: 2000).*
Kono (JP 2014158421 A) English Translation (Year: 2014).*

* cited by examiner

BUS BAR UNIT, ROTARY ELECTRIC MACHINE HAVING THE SAME, AND MANUFACTURING METHOD OF BUS BAR UNIT

TECHNICAL FIELD

The present invention relates to a bus bar unit, a rotary electric machine having the same, and a manufacturing method of the bus bar unit.

BACKGROUND ART

According to JP2013-212008A, a bus bar unit that supplies a current from a terminal part to respective coils is disclosed. The bus bar unit is formed by a plurality of annular bus bars corresponding to respective phases, and an annular insulating holder having a plurality of grooves, each of which receives each bus bar.

SUMMARY OF INVENTION

The insulating holder, in which the respective bus bars are received in the respective grooves of the insulating holder, is arranged in a mold, and melted insulating resin is injected into the mold, so that the insulating holder and the respective bus bars are integrated by insert molding.

According to the above-described conventional art, the bus bars are formed by bending a linear belt-shaped conductive member in the plate thickness direction, so as to have the shape corresponding to the circumferential direction of the stator. Therefore, by changing respective diameters of the bus bars, the plurality of bus bars can be housed in the insulating holder and then subjected to the insert molding.

However, when the bus bars are formed by punching its shape in a plate-shaped conductive member, the shape having the predetermined width and corresponding to the circumferential direction of the stator, the respective bus bars are laminated in the axial direction. In this case, the insert molding is made while the bus bars, laminated in the axial direction, are held with predetermined intervals therebetween. This makes it difficult to prevent displacement of the bus bars in the radial direction, in the circumferential direction, and in the axial direction.

It is an object of the present invention to easily prevent the displacement of the bus bars in the radial direction, in the circumferential direction, and in the axial direction.

According to one aspect of the present invention, a bus bar unit includes: a plurality of bus bars arranged to be laminated, the respective bus bars having conductivity, the respective bus bars having a hole part; an insulating member interposed between the bus bars, the insulating member having insulating property, the insulating member having a hole part; a positioning member formed by insulating resin, the positioning member having a pin protruding in direction of laminating the bus bars, the pin being inserted through the hole parts of the bus bars and the hole part of the insulating member; and a fixing part provided at a tip end of the pin, the fixing part being configured to fix the bus bars and the insulating member.

According to another aspect of the present invention, a manufacturing method of a bus bar unit, for manufacturing the bus bar unit provided with a positioning member formed by insulating resin and having a protruding pin, includes: laminating bus bars and an insulating member alternately while inserting the pin through hole parts provided in a plurality of the bus bars having conductivity, and a hole part provided in the insulating member having an insulating property; fixing the bus bars and the insulating member to the positioning member by fixing part provided at a tip end of the pin; and subjecting the bus bars, the insulating member, and the positioning member to insert molding by insulating resin.

DESCRIPTION OF EMBODIMENTS

Hereinafter, an embodiment of the present invention will be explained with reference to the attached drawings.

Figure 1:
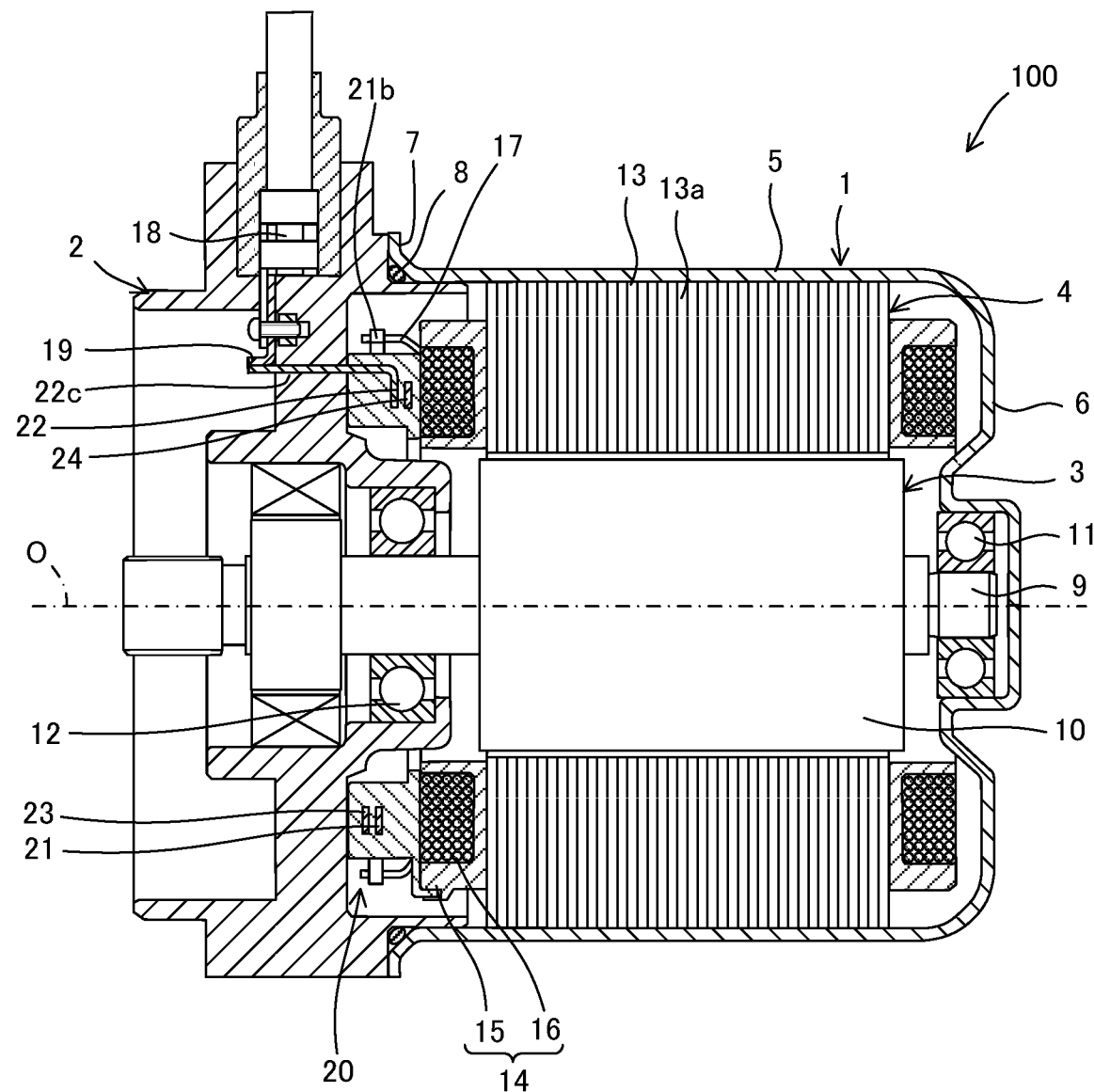
FIG. 1 is a cross-sectional view of a motor having a bus bar unit according to an embodiment of the present invention.
Figure 2:
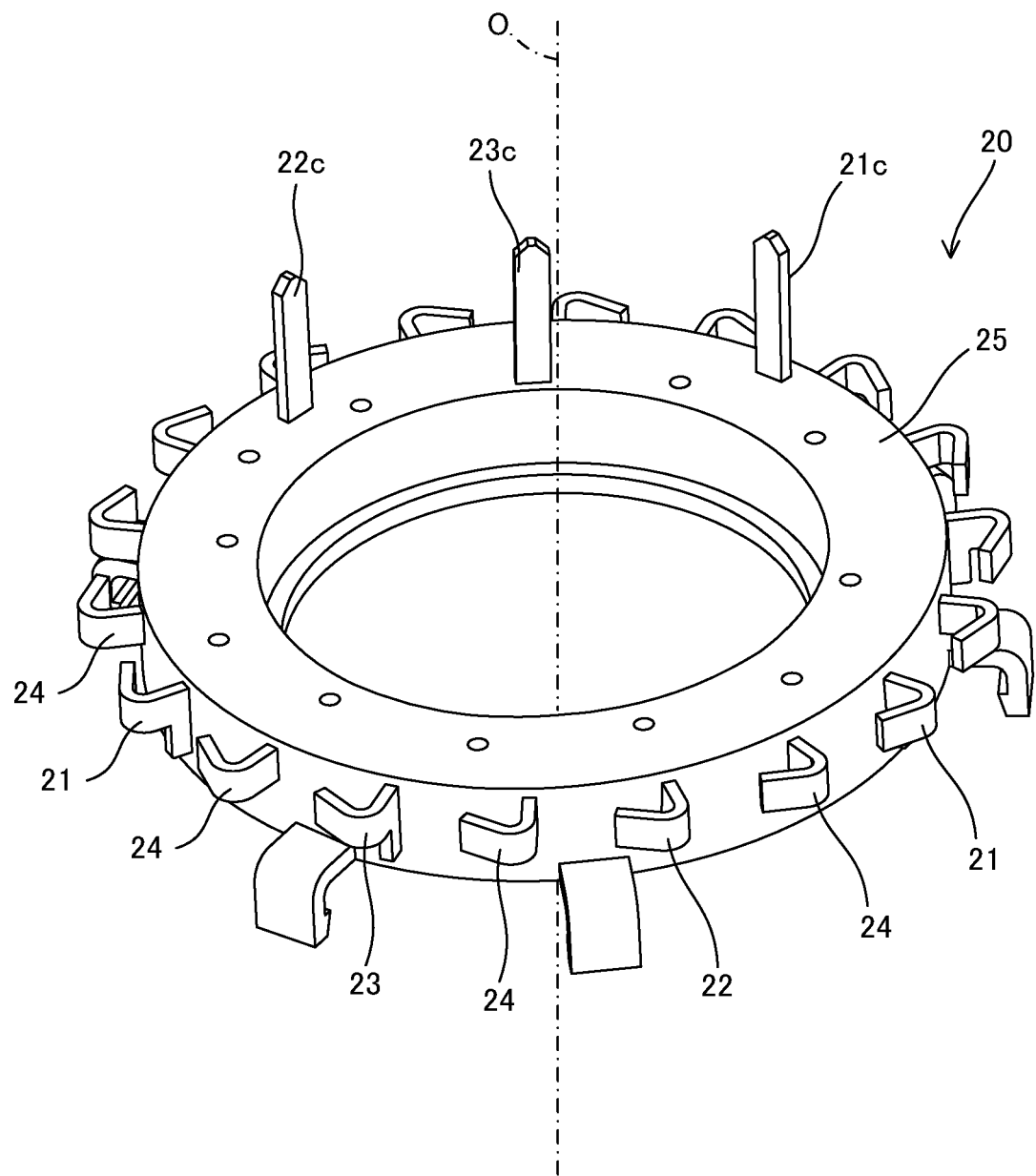
FIG. 2 is a perspective view of the bus bar unit according to the embodiment of the present invention.

FIG. 1 is a cross-sectional view of a motor 100 on which a bus bar unit 20 according to this embodiment is mounted. FIG. 2 is a perspective view of the bus bar unit 20 according to this embodiment. It should be noted that, in the following explanation, the direction of a rotation axis of the motor 100 is referred to as the "axial direction", the radiation direction about the rotation axis of the motor 100 is referred to as the "radial direction", and the direction about the rotation axis of the motor 100 is referred to as the "circumferential direction".

The motor 100, as a rotary electric machine, is a three-phase (U-phase, V-phase, W-phase) AC motor, and is used for an electric power steering system or the like of a vehicle, for example. The motor 100 is provided with a motor case 1 that is made of metal, a motor cover 2 that is formed by an insulating resin material and that is provided to cover an opening part of the motor case 1, a rotor 3 that is received in the motor case 1 and that is pivotally supported by the motor case 1 and the motor cover 2 to be able to rotate, and a stator 4 that is provided on the inner peripheral surface of the motor case 1 and that is arranged with a predetermined space between itself and the outer periphery of the rotor 3.

The motor case 1 includes a tube part 5 that has a cylindrical shape, a bottom part 6 that closes one end of the tube part 5, and an opening end part 7 that has an annular shape and that is formed around an opening part opening at the other end of the tube part 5.

The motor cover 2 is engaged to the opening end part 7 of the motor case 1 by a plurality of bolts (not illustrated). Sealing between the motor cover 2 and the motor case 1 is provided by a seal ring 8.

The rotor 3 includes a rotor shaft 9 that is rotatably supported by the motor case 1, and a rotor core 10 that has the rotor shaft 9 inserted therethrough in the axial direction and that receives a plurality of magnets (permanent magnets) arranged at predetermined intervals in the circumferential direction.

One end side of the rotor shaft 9 is supported by the bottom part 6 of the motor case 1 via a bearing 11, and the other end side thereof is supported by the motor cover 2 via a bearing 12. Thus, the rotor 3 is rotatably supported about a central axis O.

The stator 4 includes a stator core 13 that is provided inside the motor case 1, a plurality of stator coils 14 that are provided on the stator core 13 at predetermined intervals along the circumferential direction, and a bus bar unit 20 that is arranged next to the stator coil 14 in the axial direction.

The stator core 13 is formed by a magnetic material, and is formed by laminating a plurality of steel plates in the axial direction, the steel plates having a plurality of tooth parts 13a radially extending in the radial direction. The stator core 13 is fixed to the motor case 1 as its outer periphery is fitted to the inner periphery of the motor case 1.

The stator coils 14 are formed by a plurality of insulators 15 that are formed by an insulating resin material surrounding the respective tooth parts 13a of the stator core 13, and a plurality of electromagnetic coils 16 that serve as coils formed by wires wound around the tooth parts 13a via the insulators 15.

The end part of a wire 17 of each electromagnetic coil 16 is pulled out from a space between the bus bar unit 20 and the insulator 15 to the outside of the stator coil 14. Each of the electromagnetic coils 16 corresponds to any one of the U-phase, the V-phase, and the W-phase. The electromagnetic coils 16 are connected to the bus bar unit 20 via the end parts of the wires 17 of the coils of the respective phases.

The bus bar unit 20 is formed by a plurality of bus bars 21 to 24 that are formed by a conductive material energizing the electromagnetic coils 16 wound around the stator 4, and an insulating resin 25 that holds the bus bars 21 to 24 in its inside. The plurality of bus bars 21 to 24 and the insulating resin 25 are formed integrally by insert molding.

Upon assembly of the motor 100, the stator coils 14 are assembled to the stator core 13, and thereafter, the bus bar unit 20 is assembled to the stator coils 14. At this time, the wire 17 of each electromagnetic coil 16 is extended from a space between the opening end of the insulator 15 and the outer peripheral end of the bus bar unit 20, and its tip end part is welded to each of feeding terminals 21b to 24b of each of the bus bars 21 to 24.

Next, the stator 4 is assembled to the motor case 1, and thereafter, the motor cover 2 is assembled to the motor case 1. At this time, three bus bar terminals 21c to 23c that protrude from one end of the bus bar unit 20 penetrate through respective holes of the motor cover 2.

Terminals 19 that are connected to electric wires 18, corresponding to the respective phases, are provided on the motor cover 2. The motor cover 2 is engaged to the motor case 1, and thereafter, the bus bar terminals 21c to 23c are welded to one ends of the terminals 19.

When the motor 100 is operating, a driving current is supplied to the respective electromagnetic coils 16 via the electric wires 18, the terminals 19, and the bus bars 21 to 24, and the rotor 3 is rotated by magnetic force generated in the stator core 13.

Figure 3:
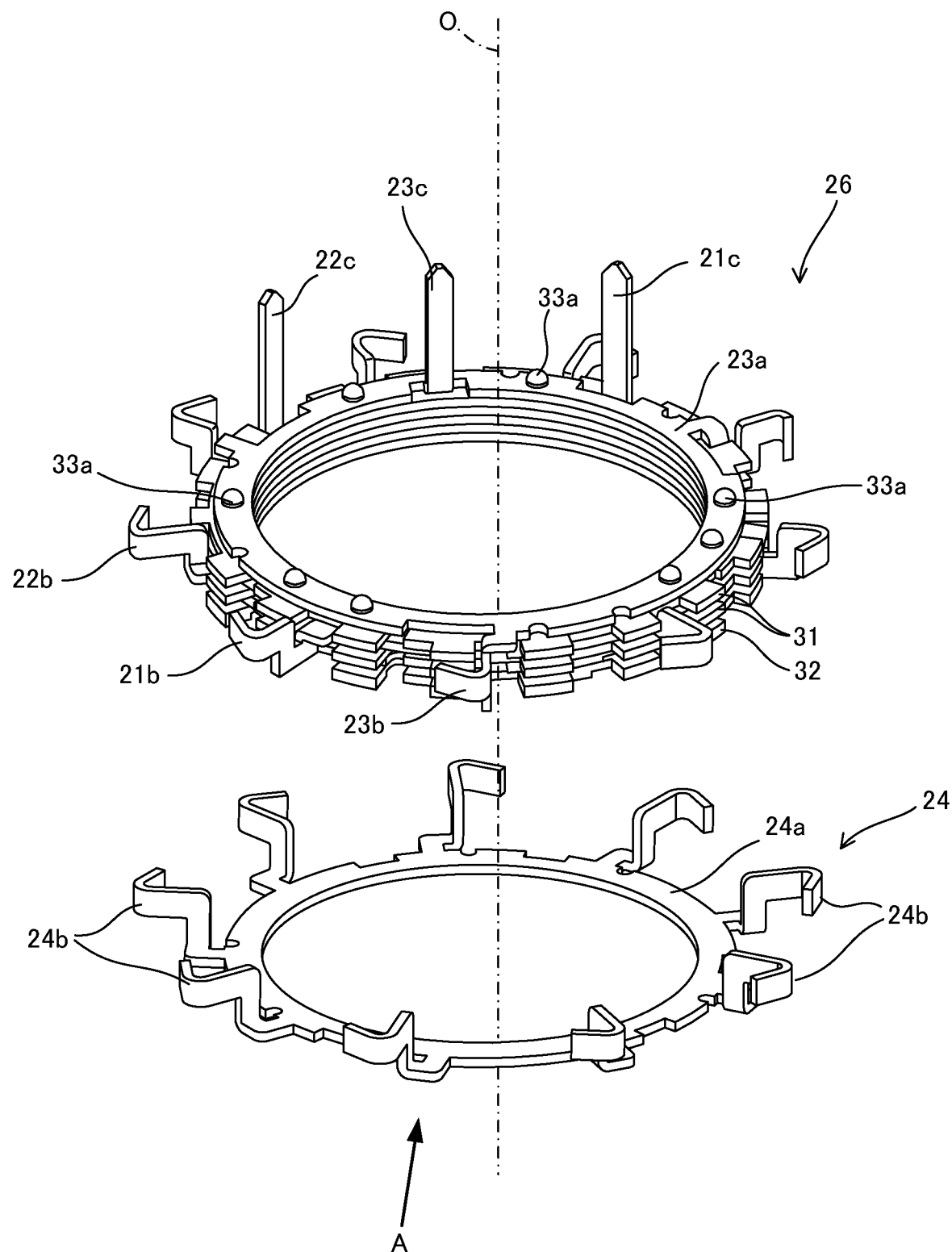
FIG. 3 is a perspective view illustrating the bus bar unit in an exploded manner.
Figure 4:
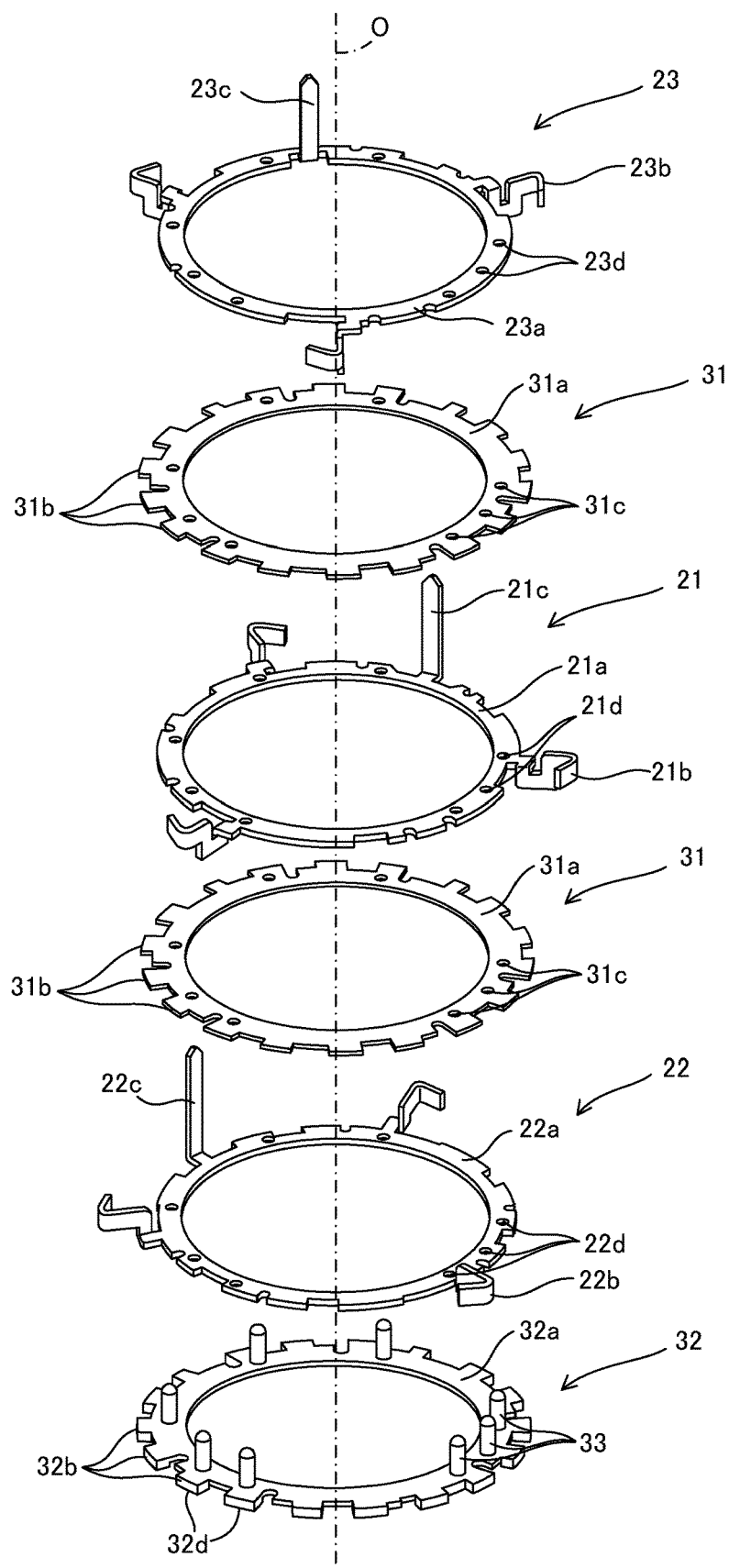
FIG. 4 is a perspective view illustrating a heat welded component in an exploded manner.

FIG. 3 is a perspective view illustrating the bus bar unit 20 in an exploded manner. FIG. 4 is a perspective view illustrating a heat welded component 26 in an exploded manner.

The plurality of bus bars 21 to 24 are formed by four bus bars, that is, the bus bar 21 corresponding to the U-phase, the bus bar 22 corresponding to the V-phase, the bus bar 23 corresponding to the W-phase, and a neutral-point bus bar (the bus bar for a neutral point) 24, serving as a second bus bar, that electrically connects the neutral points of the respective phases. The respective bus bars 21 to 24 include annular conductive parts 21a to 24a, each of which extends in an annular shape about the central axis O, and the three feeding terminals 21b to 24b that are provided to protrude in the radial direction from the annular conductive parts 21a to 24a. The feeding terminal 24b of the neutral-point bus bar 24 is for connecting the electromagnetic coils of the respective phases. Further, the bus bars 21 to 23 of the respective phases include one bus bar terminals 21c to 23c that are provided to protrude in the axial direction from the annular conductive parts 21a to 23a.

The bus bar unit 20 is formed by insert molding, by the insulating resin 25, the heat welded component 26, in which the U-phase bus bar 21, the V-phase bus bar 22, and the W-phase bus bar 23 are integrated, and the neutral-point bus bar 24.

The heat welded component 26 is formed by the U-phase bus bar 21, the V-phase bus bar 22, the W-phase bus bar 23, resin plates 31 that serve as insulating members formed by insulating resin and that are interposed between the bus bars next to each other in the axial direction, and a positioning plate 32 that serves as a positioning member formed by the insulating resin 25 and that has a plurality of pins 33. The pins 33 are provided along the circumferential direction and protruding in the axial direction.

The positioning plate 32 is arranged at one end in the axial direction (lower end in FIG. 4), and is formed to have an annular plate shape whose inner diameter and outer diameter are almost identical to those of the bus bars 21 to 23 of the respective phases. The positioning plate 32 includes an annular plate part 32a that serves as an annular insulating part extending in an annular shape about the central axis O, a plurality of extending parts 32b that serve as restricting parts extending from the annular plate part 32a toward the outer side in the radial direction, and the plurality of pins 33 that protrude from the annular plate part 32a toward the other end side in the axial direction (upper side in FIG. 4).

The annular plate part 32a, whose thickness is almost identical to those of the bus bars 21 to 23 of the respective phases, has the pins 33 that are provided to protrude on its surface. Each extending part 32b is extended from the annular plate part 32a toward the outer side in the radial direction. The extending part 32b further includes a protruding part 32d that is protruded toward one end side in the axial direction. Namely, the thickness of the extending part 32b is greater than that of the annular plate part 32a, and, on the back of the annular plate part 32a, a step is formed by the protruding part 32d on the border between itself and the extending part 32b. Each pin 33 is provided to protrude on the surface of the annular plate part 32a, and is formed in such a manner that its length in the axial direction becomes greater than the total thickness of the bus bars 21 to 23 of the respective phases and the resin plates 31.

Each resin plate 31 includes an annular plate part 31a that is formed to have the annular plate shape, whose inner diameter and outer diameter are almost identical to those of the bus bars 21 to 23 of the respective phases and that has the thickness almost identical to that of the bus bars 21 to 23 of the respective phases, a plurality of extending parts 31b that are extended from the annular plate part 31a to the outer side in the radial direction, and a plurality of positioning holes 31c that are formed to penetrate the annular plate part 31a in the axial direction.

Each extending part 31b has the thickness identical to that of the annular plate part 31a, and the number of the extending parts 31b to be formed is identical to the number of the extending parts 32b of the positioning plate 32. The extending parts 31b of the resin plate 31 are disposed in such a manner that these positions in the circumferential direction correspond to the positions of the extending parts 32b of the positioning plate 32. The positions of the positioning holes 31c, in the circumferential direction and in the radial direction, are defined so that the pins 33 of the positioning plate 32 can be inserted therethrough.

The bus bars 21 to 23 of the respective phases include a plurality of positioning holes 21d to 23d that are formed to penetrate the annular conductive parts 21a to 23a in the axial direction. The circumferential positions of the positioning holes 21d to 23d are defined in such a manner that the pins 33 of the positioning plate 32 can be inserted therethrough.

The heat welded component 26 is formed by laminating, on the positioning plate 32, the V-phase bus bar 22, the resin plate 31, the U-phase bus bar 21, the resin plate 31, and the W-phase bus bar 23 in this order along the axial direction. At this time, the pins 33 of the positioning plate 32 are inserted through the respective positioning holes 21d to 23d and 31c of the V-phase bus bar 22, the resin plate 31, the U-phase bus bar 21, the resin plate 31, and the W-phase bus bar 23. Further, the feeding terminals 21b to 23b of the bus bars 21 to 23 of the respective phases are arranged between the adjacent extending parts 31b of the resin plates 31.

Thereafter, heat caulking parts 33a (serving as a fixing part respectively) are formed at the tip ends of the pins 33, and thus, the V-phase bus bar 22, the resin plate 31, the U-phase bus bar 21, the resin plate 31, and the W-phase bus bar 23 are sandwiched between the annular plate part 32a and the heat caulking parts 33a, and the positioning plate 32, the V-phase bus bar 22, the resin plate 31, the U-phase bus bar 21, the resin plate 31, and the W-phase bus bar 23 are integrally fixed by heat caulking.

Thus, the circumferential and radial positions of the bus bars 21 to 23 of the respective phases are defined. In addition, the bus bars 21 to 23 of the respective phases are held with spaces therebetween in the axial direction by the thickness of the interposed resin plates 31, and thus the axial positions of the bus bars 21 to 23 of the respective phases are defined.

Figure 5:
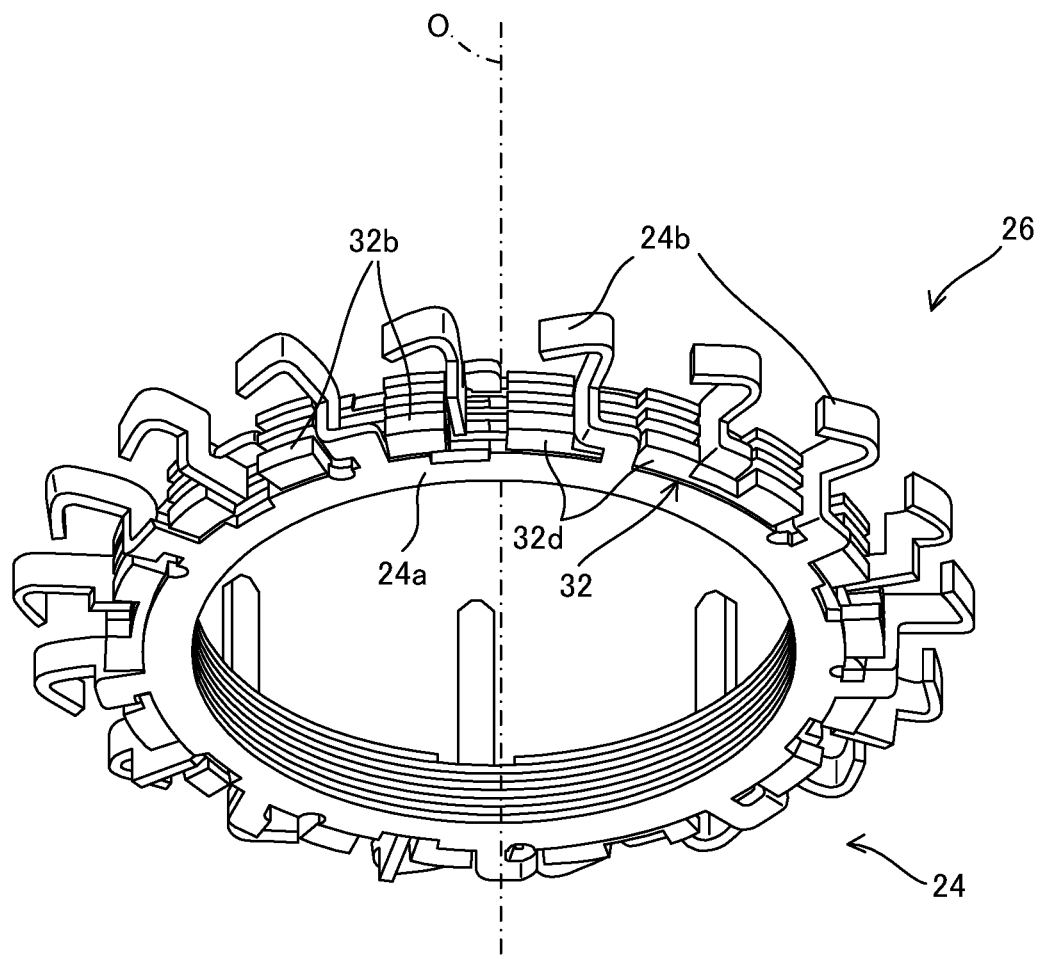
FIG. 5 is a perspective view illustrating the state where the heat welded component and a bus bar for a neutral point are laminated, and the state viewed from an arrow A of FIG. 3.

FIG. 5 is a perspective view illustrating the state where the heat welded component 26 and the neutral-point bus bar 24 are laminated, and the state viewed from an arrow A of FIG. 3.

The neutral-point bus bar 24 is attached to thus-formed heat welded component 26 from the back side (lower side in FIG. 5). At this time, the feeding terminals 24b of the neutral-point bus bar 24 are arranged between the adjacent extending parts 32b of the positioning plate 32.

As the extending parts 32b of the positioning plate 32 are extended to the back side from the annular plate part 32a, the radial position of the neutral-point bus bar 24 is defined by the steps formed by the plurality of extending parts 32b provided along the circumferential direction.

Further, when the neutral-point bus bar 24 is attached to the inner diameter side of the extending parts 32b, the feeding terminals 24b are fitted between the adjacent extending parts 32b, and thus the circumferential position of the neutral-point bus bar 24 is defined.

Furthermore, the neutral-point bus bar 24 is abutted against the annular plate part 32a of the positioning plate 32, and thus, the neutral-point bus bar 24 is held with a space in the axial direction by the thickness of the positioning plate 32. Thereby, the axial position of the neutral-point bus bar 24 is defined.

Next, the process of manufacturing the bus bar unit 20 will be explained.

First, as illustrated in FIG. 4, the V-phase bus bar 22, the resin plate 31, the U-phase bus bar 21, the resin plate 31, and the W-phase bus bar 23 are laminated on the positioning plate 32 in this order along the axial direction, in such a manner that the pins 33 are inserted through the positioning holes 21d to 23d and 31c.

Then, as illustrated in FIG. 3, the tip ends of the pins 33 are heated, melted and deformed to form the heat caulking parts 33a. Thereby, the positioning plate 32, the V-phase bus bar 22, the resin plate 31, the U-phase bus bar 21, the resin plate 31, and the W-phase bus bar 23 are integrally fixed by heat welding, and the heat welded component 26 is completed.

Figure 6:
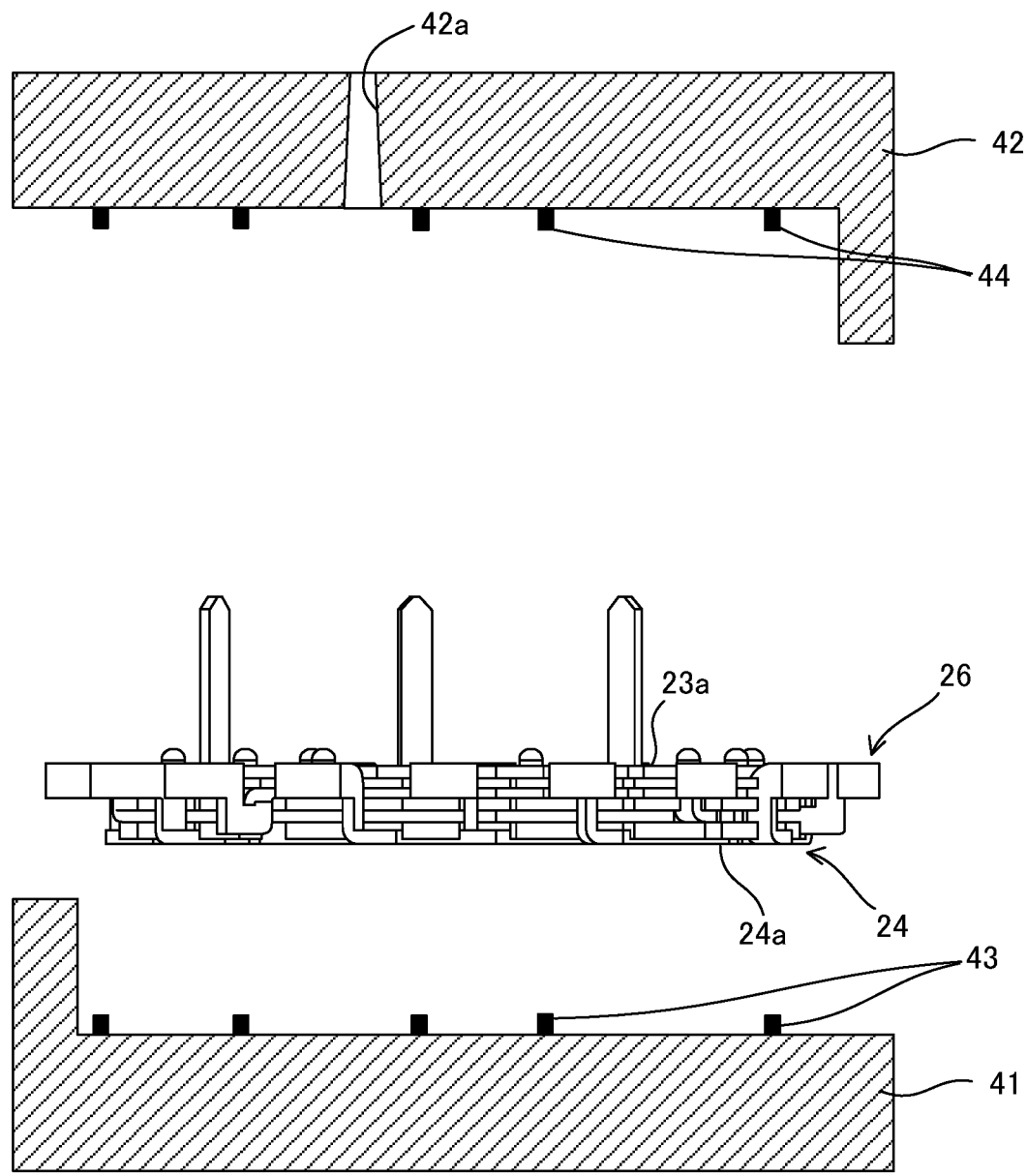
FIG. 6 is a cross-sectional view for explaining insert molding, illustrating the state before an upper mold is placed on a lower mold.
Figure 7:
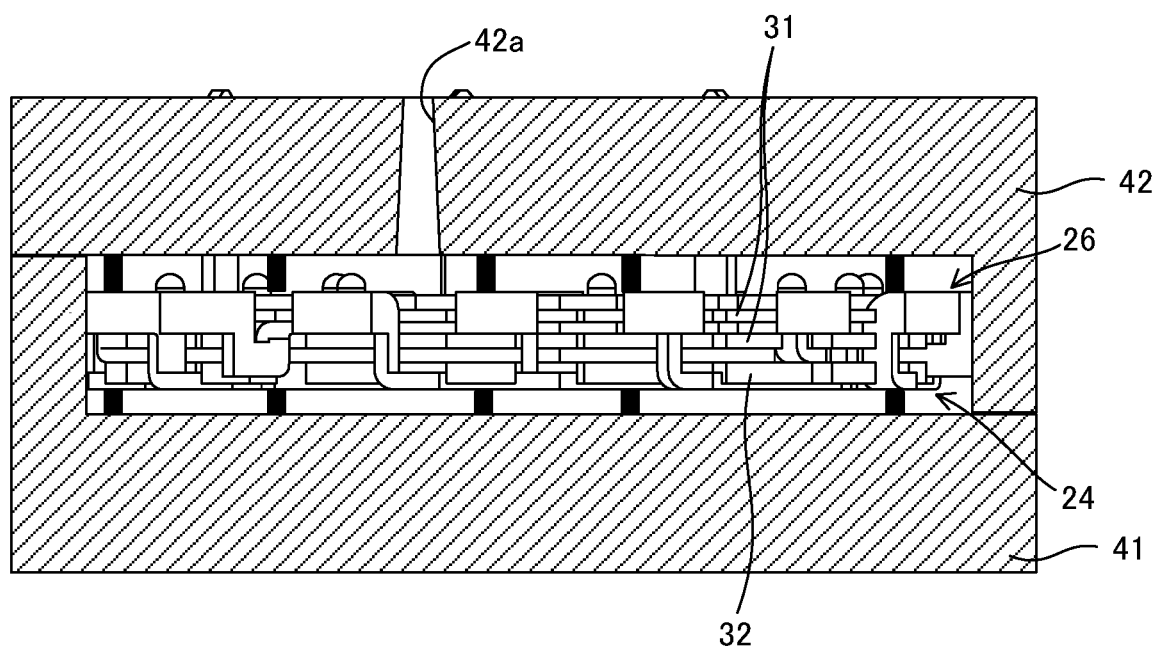
FIG. 7 is a cross-sectional view for explaining the insert molding, illustrating the state after the upper mold is placed on the lower mold.

FIG. 6 and FIG. 7 are cross-sectional views for explaining the insert molding.

The insert molding is such a molding method that the heat welded component 26 and the neutral-point bus bar 24, as illustrated in FIG. 3, are sandwiched by a lower mold 41, arranged on the lower side in the vertical direction, and an upper mold 42, arranged on the upper side of the lower mold 41, and are integrated by the insulating resin 25. The upper mold 42 has an injection hole 42a, penetrating through the upper mold 42 in the vertical direction, for injecting the melted insulating resin 25.

Support pins 43 that support the annular conductive part 24a of the neutral-point bus bar 24 are provided on the lower mold 41. On the upper mold 42, support pins 44 that support the annular conductive part 23a of the W-phase bus bar 23, as the upper surface of the heat welded component 26, are provided. Namely, the neutral-point bus bar 24 and the heat welded component 26 are sandwiched vertically by the support pins 44 provided on the upper mold 42 and the support pins 43 provided on the lower mold 41.

In FIG. 6 and FIG. 7, the numbers of the illustrated support pins 43 of the lower mold 41 and the support pins 44 of the upper mold 42 are five, respectively, in order to simplify the explanation, but the numbers of the actually-provided support pins 43 and 44 are 12, respectively. It should be noted that the numbers of the support pins 43 and 44 are not restrictive, and the numbers may be 11 or less or 13 or more.

As illustrated in FIG. 6, the neutral-point bus bar 24 and the heat welded component 26 are placed, in this order, on the lower mold 41. At this time, the heat welded component 26 may be placed after the neutral-point bus bar 24 is placed on the lower mold 41, and thereafter, the neutral-point bus bar 24 may be attached to the back surface of the positioning plate 32 of the heat welded component 26. Alternatively, the neutral-point bus bar 24 and the heat welded component 26 may be attached first and then these may be placed on the lower mold 41.

Next, as illustrated in FIG. 7, the upper mold 42 is placed on and pressed against the lower mold 41. Thereby, the heat welded component 26 and the neutral-point bus bar 24 are sandwiched between the support pins of the upper mold 42 and the support pins of the lower mold 41.

In this state, the melted insulating resin 25 is injected from the injection hole 42a of the upper mold 42 into a space defined between the upper mold 42 and the lower mold 41.

At this time, power, especially in the vertical direction, acts on the respective bus bars 21 to 24, due to the injection pressure of the insulating resin 25, but the spaces between the bus bars 21 to 24 are maintained because the respective bus bars 21 to 24 are laminated via the resin plates 31 and the positioning plate 32.

After the insulating resin 25 is cured, the upper mold 42 and the lower mold 41 are removed, and the bus bar unit 20 as illustrated in FIG. 2 is completed.

The following effects can be obtained by the above-described embodiment.

The heat welded component 26 is formed by alternately laminating the bus bars 21 to 23 of the respective phases and the resin plates 31 on the positioning plate 32, and by forming the heat caulking parts 33a at the tip ends of the pins 33 of the positioning plate 32. The pins 33 of the positioning plate 32 define the radial positions and the circumferential positions of the bus bars 21 to 23 of the respective phases, and the resin plates 31 define the axial positions of the bus bars 21 to 23 of the respective phases, which makes it possible to prevent displacement of the bus bars 21 to 23 of the respective phases in the radial direction, in the circumferential direction, and in the axial direction, with ease and with more reliability.

Further, the heat welded component 26 and the neutral-point bus bar 24 are subjected to the insert molding by the insulating resin 25, and thus the heat welded component 26 and the neutral-point bus bar 24 can be integrally fixed to each other with more reliability.

Furthermore, the heat welded component 26 is integrally fixed by alternately laminating the bus bars 21 to 23 of the respective phases and the resin plates 31 on the positioning plate 32, and by forming the heat caulking parts 33a on the tip ends of the pins 33 of the positioning plate 32, which makes it possible to prevent the displacement of the respective bus bars 21 to 24, caused by the pressure of the insulating resin 25 at the time of the insert molding.

Further, the neutral-point bus bar 24 is arranged on the back surface of the positioning plate 32 and on the inner side of the plurality of the extending parts 32b, which makes it possible to fix the neutral-point bus bar 24 with more reliability, with respect to the radial direction. Thereby, at the time of the insert molding of the heat welded component 26 and the neutral-point bus bar 24, it is possible to prevent the displacement of the neutral-point bus bar 24, caused by the pressure of the insulating resin 25.

Furthermore, the bus bar unit 20 requires only one insert molding of the heat welded component 26 and the neutral-point bus bar 24 by the insulating resin 25, which makes it possible to reduce the molds, facilities required for the insert molding and the like, as compared with the conventional manufacturing method that requires the insert molding for two or more times. Therefore, the bus bar unit 20 can be manufactured more easily and at low cost.

Embodiments of this invention were described above, but the above embodiments are merely examples of applications of this invention, and the technical scope of this invention is not limited to the specific constitutions of the above embodiments.

According to the above-described embodiment, for example, the bus bars 21 to 23 of the respective phases, together with the resin plates 31, are laminated on the positioning plate 32. Instead, the neutral-point bus bar 24 may be laminated thereon, together with the bus bars 21 to 23 of the respective phases, in a similar manner. In this case, for example, the neutral-point bus bar 24 may be laminated between the positioning plate 32 and the V-phase bus bar 22, in FIG. 4, and a new resin plate 31 may be laminated between the neutral-point bus bar 24 and the V-phase bus bar 22. Thus, the bus bar unit 20 can be manufactured without the insert molding by the insulating resin 25.

According to the above-described embodiment, the extending parts 32b of the positioning plate 32 are formed to have greater thickness than that of the annular plate part 32a. Instead, only a part of the extending parts 32b may be formed to have the greater thickness than that of the annular plate part 32a. It is possible to define the radial position of the neutral-point bus bar 24 when three or more extending parts 32b are formed to have the greater thickness.

According to the above-described embodiment, the positioning plate 32 has the eight pins 33. However, the positioning plate 32 may have nine or more pins 33 or seven or less pins 33, as long as the positioning holes 21d to 23d of the bus bars 21 to 23 of the respective phases can be provided at the positions where the strength of the bus bars 21 to 23 of the respective phases can be secured.

According to the above-described embodiment, the heat caulking parts 33a are formed by the heat welding. Instead, the heat caulking parts 33a may be formed by ultrasonic caulking (ultrasonic welding).

Although the above-described embodiment illustrates the motor 100 that generates power by electric power, it is possible to apply this embodiment to a generator that generates electric power by power.

According to the above-described embodiment, the positioning plate 32, the bus bars 21 to 23, and the resin plates 31 are integrally fixed by forming the heat caulking parts 33a by heating, melting and deforming the tip ends of the pins 33. Instead of the heat caulking, however, the positioning plate 32, the bus bars 21 to 23, and the resin plates 31 may be integrally fixed by providing a fitting member in an annular shape or in an arc shape and fitting the fitting member to the tip end parts of the pins.

Instead of the heat caulking, the diameters of the tip end parts of the pins 33 may be set to be greater than the inner diameters of the respective positioning holes 21d to 23d and 31c, and the tip end parts of the pins 33 may be press-fitted into the respective positioning holes 21d to 23d, and 31c, so as to integrally fix the positioning plate 32, the bus bars 21 to 23, and the resin plates 31.

The invention claimed is:

1. A bus bar unit, comprising:
a plurality of first bus bars arranged to be laminated, the first bus bars respectively having a conductivity, each of the first bus bars having a hole part;
an insulating member interposed between the first bus bars, the insulating member having an insulating property, the insulating member having a hole part;
a positioning member formed by an insulating resin, wherein the positioning member includes
an annular insulating part having an annular shape, and having a first surface facing the first bus bars and a second surface opposite to the first surface, the annular insulating part being stacked in a direction of laminating the first bus bars,
a pin protruding from the first surface of the annular insulating part in a first direction parallel to the direction of laminating the first bus bars, the pin being inserted through the hole parts of the first bus bars and the hole part of the insulating member, and
a restricting part having a convex shape, and extending outward in a radial direction of the annular insulating part, and including a plurality of protruding parts that protrude from the second surface of the annular insulating part in a second direction opposite and parallel to the first direction;

a second bus bar having a conductivity, being disposed at a second surface side of the annular insulating part, and abutting against the protruding parts of the restricting part, wherein the second bus bar includes an annular conductive part having an annular shape, and a feeding terminal extending outward in a radial direction of the annular conductive part, the feeding terminal being fitted between an adjacent two of the protruding parts of the restricting part; and a fixing part provided at a tip end of the pin, the fixing part being configured to fix the first bus bars and the insulating member.

2. The bus bar unit according to claim 1, wherein the fixing part is a heat caulking part provided at the tip end of the pin, and wherein the first bus bars and the insulating member are fixed to the positioning member as the heat caulking part is plastically deformed.

3. The bus bar unit according to claim 1, wherein the fixing part is a fitting member having an annular shape or an arc shape, and wherein the first bus bars and the insulating member are fixed to the positioning member as the fitting member is fitted to the tip end of the pin.

4. The bus bar unit according to claim 1, wherein the fixing part is a tip end part of the pin, and wherein the first bus bars and the insulating member are fixed to the positioning member as the tip end part of the pin is press-fitted into the hole parts of the first bus bars.

5. A rotary electric machine having the bus bar unit according to claim 1, comprising:

a stator;

coils of respective phases wound around the stator, one ends of the coils being connected to the first bus bars; and a neutral-point bus bar, as the second bus bar, connected to other ends of the coils.

6. A manufacturing method of a bus bar unit, for manufacturing the bus bar unit provided with a positioning member formed by an insulating resin, the positioning member including an annular insulating part having an annular shape, and having a first surface and a second surface opposite to the first surface, a protruding pin provided on the first surface of the annular insulating part, and a restricting part having a convex shape, and extending outward in a radial direction of the annular insulating part, the restricting part including a plurality of protruding parts protruding from the second surface of the annular insulating part, the manufacturing method of the bus bar unit comprising:

laminating first bus bars having conductivity and an insulating member having an insulating property alternately while inserting the protruding pin of the positioning member through hole parts provided in the first bus bars, and the insulating member;

fixing the first bus bars and the insulating member to the positioning member by a fixing part provided at a tip end of the pin;

causing a second bus bar, having conductivity, to abut against the protruding parts of the restricting part from a one side of the positioning member that is opposite to an other side of the positioning member where the first bus bars and the insulating member are fixed;

inserting an insulating resin in a mold in which the first bus bars, the insulating member, the positioning member, and the second bus bar are placed therein, for integrally molding each element by insert molding.

7. The bus bar unit according to claim 1, further comprising:

an insulating resin part integrally fixing the first bus bars, the insulating member, the positioning member and second bus bar.

8. The bus bar unit according to claim 1, wherein the annular conductive part of the second bus bar has a first surface that faces the second surface of the annular insulating part of the positioning member, and a second surface opposite to the first surface of the annular conductive part, and the first surface of the annular conductive part directly contacts the protruding parts in the first direction.

* * * * *